US012668236B2

(12) United States Patent　　(10) Patent No.:　US 12,668,236 B2
Heitzmann　　(45) Date of Patent:　Jun. 30, 2026

(54) MULTIDIRECTIONAL MICROPHONES FOR OCCLUSIONS

(71) Applicant: Valeo Telematik und Akustik GmbH, Friedrichsdorf (DE)

(72) Inventor: Thomas Heitzmann, Troy, MI (US)

(73) Assignee: Valeo Telematik und Akustik GmbH (DE)

( * ) Notice: Subject to any disclaimer, the term of this patent is extended or adjusted under 35 U.S.C. 154(b) by 82 days.

(21) Appl. No.: 18/678,186

(22) Filed: May 30, 2024

(65) Prior Publication Data

US 2025/0368191 A1　　Dec. 4, 2025

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2420/403* (2013.01); *B60W 2420/54* (2013.01)

(58) Field of Classification Search
CPC .......... B60W 30/09; B60W 30/18036; B60W 30/18159; B60W 30/095; B60W 30/0956; B60W 40/02; B60W 40/04; B60W 60/001; B60W 60/0015; B60W 60/0016; B60W 60/0017; B60W 2420/403; B60W 2420/54; G08G 1/01; G08G 1/017; G08G 1/04; G08G 1/16; G08G 1/166; G06V 20/56; G06V 20/58; G05D 1/0214; G05D 1/0255; G05D 1/617; G05D 1/639
See application file for complete search history.

(56) References Cited

U.S. PATENT DOCUMENTS

| | | | | |
|---|---|---|---|---|
| 9,278,689 | B1 * | 3/2016 | Delp ..................... | G08G 1/0965 |
| 2010/0214086 | A1 * | 8/2010 | Yoshizawa ............. | G08G 1/166 |
| | | | | 381/56 |
| 2011/0175755 | A1 * | 7/2011 | Yoshioka ............... | G08G 1/167 |
| | | | | 340/988 |
| 2018/0053413 | A1 * | 2/2018 | Patil ..................... | G08G 1/0965 |
| 2020/0272166 | A1 * | 8/2020 | Sakurada ............. | G05D 1/0255 |
| 2020/0379108 | A1 * | 12/2020 | Vijayalingam ........ | G06V 20/58 |
| 2021/0302988 | A1 * | 9/2021 | Chebiyyam ........... | G01S 7/4861 |

FOREIGN PATENT DOCUMENTS

DE　　　102021112711 A1　　11/2022

* cited by examiner

*Primary Examiner* — Brandon Z Willis
(74) *Attorney, Agent, or Firm* — Dickinson Wright PLLC

(57)　　　　　　ABSTRACT

A method performed by a computing device configured to control an autonomous or semi-autonomous driving task of a vehicle includes identifying, based on image data obtained from one or more sensors, an area of interest corresponding to the driving task, determining whether the area of interest includes an obstructed region for which line-of-sight of at least one of the one or more sensors is blocked by an object, determining, in response to a determination that the area of interest includes the obstructed region, whether the area of interest includes a moving vehicle based on audio signals received by one or more audio sensors of the vehicle, and controlling the vehicle to perform the driving task based on the determination of whether the area of interest includes a moving vehicle.

20 Claims, 6 Drawing Sheets

400

MULTIDIRECTIONAL MICROPHONES FOR OCCLUSIONS

TECHNICAL FIELD

The present disclosure relates to autonomous driving systems and methods, and more particularly to supplementing sensor data with audio data of an environment.

BACKGROUND

Modern automotive vehicles are typically equipped with a variety of sensors. Whether internal or external to the passenger cabin of the vehicle, these sensors provide the foundation for driving automation and vehicle autonomy. Vehicles with autonomous or semi-autonomous driving or driver-assistant features use these sensors and associated computer vision technology to maneuver the vehicle. For example, vehicles may be equipped with a camera and image processing capabilities that detect objects, such as other vehicles. This information can assist the vehicle to avoid the objects.

SUMMARY

A method performed by a computing device configured to control an autonomous or semi-autonomous driving task of a vehicle includes identifying, based on image data obtained from one or more sensors, an area of interest corresponding to the driving task, determining whether the area of interest includes an obstructed region for which line-of-sight of at least one of the one or more sensors is blocked by an object, determining, in response to a determination that the area of interest includes the obstructed region, whether the area of interest includes a moving vehicle based on audio signals received by one or more audio sensors of the vehicle, and controlling the vehicle to perform the driving task based on the determination of whether the area of interest includes a moving vehicle.

A system configured to control an autonomous or semi-autonomous driving task of a vehicle includes one or more sensors configured to obtain image data in an area of interest corresponding to the driving task, and a computing system configured to determine whether the area of interest includes an obstructed region for which line-of-sight of at least one of the one or more sensors is blocked by an object, in response to a determination that the area of interest includes the obstructed region, determine, based on audio signals received by one or more audio sensors of the vehicle, whether the area of interest includes a moving vehicle, and selectively control the vehicle to perform the driving task based on the determination of whether the area of interest includes a moving vehicle.

A processor is configured to execute instructions stored on a non-transitory computer-readable medium to cause the processor to identify, based on image data obtained from one or more sensors, an area of interest corresponding to a driving task of an autonomous or semi-autonomous vehicle, determine whether the area of interest includes an obstructed region for which line-of-sight of at least one of the one or more sensors is blocked by an object, in response to a determination that the area of interest includes the obstructed region, determine, based on audio signals received by one or more audio sensors of the vehicle, whether the area of interest includes a moving vehicle, and selectively control the vehicle to perform the driving task based on the determination of whether the area of interest includes a moving vehicle.

In an embodiment, a method includes steps corresponding to functions performed by any system described herein.

In an embodiment, a tangible, non-transitory computer-readable medium stores instructions that, when executed, cause a processing device to perform any operation of any method disclosed herein.

In an embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

DETAILED DESCRIPTION

Figure 1:
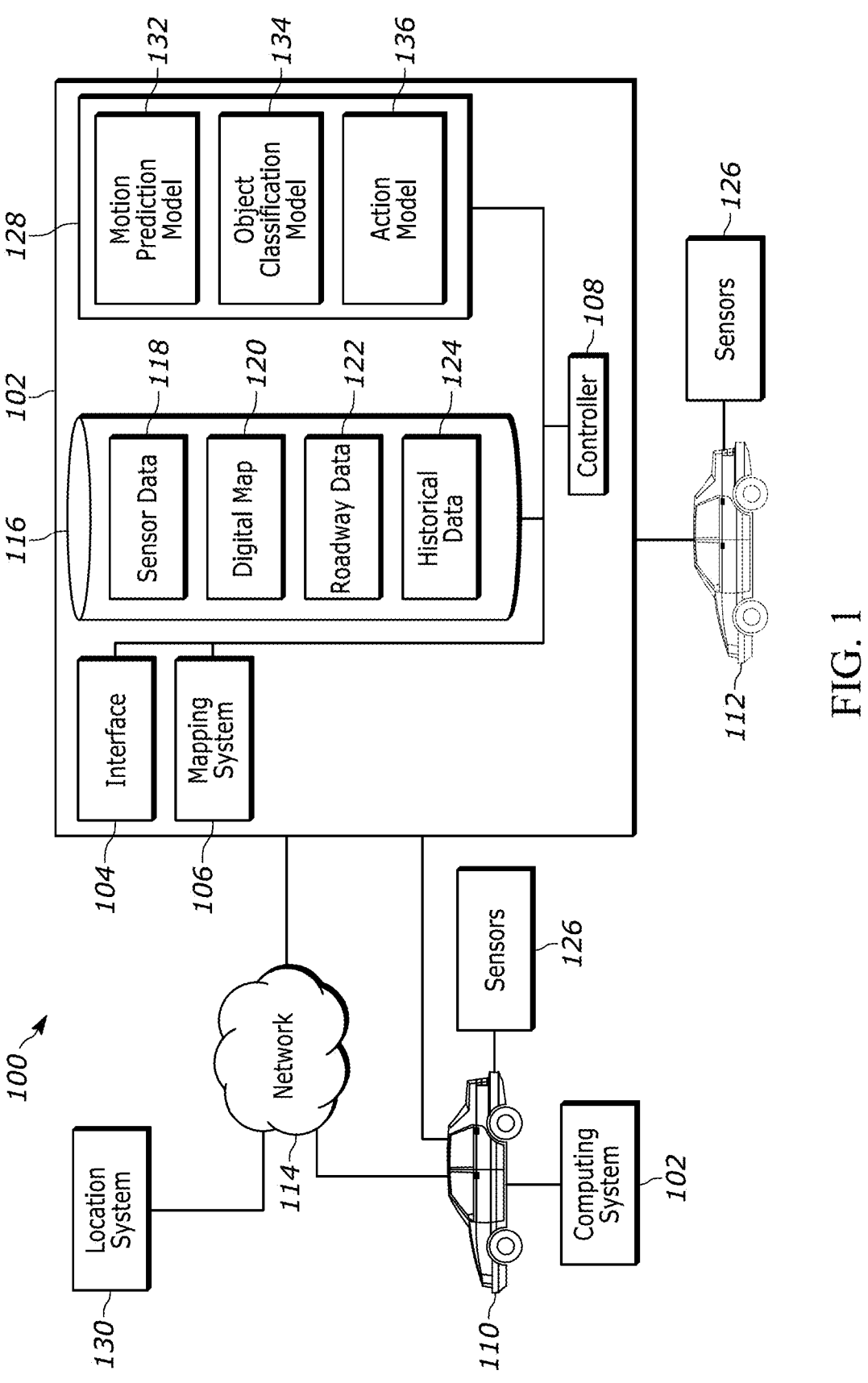
FIG. 1 illustrates a block diagram of an example system for assisting a driver or vehicle in detecting an object in the roadway according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Some portions of this description describe the embodiments of the disclosure in terms of algorithms, functions, and other operations. These operations are understood to be implemented by computer programs and/or equivalent electrical circuits, machine code, etc., examples of which are disclosed herein. Furthermore, these arrangements of operations may be referred to as modules or units, without loss of generality. The described operations and their associated modules or units may be embodied in software, firmware, and/or hardware. In an example, a module or unit corresponds to one or more computing devices, processors or processing devices, and/or other circuitry configured to perform the operations described herein.

Steps, operations, functions, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

Vehicles may be equipped with a variety of sensors configured to provide the foundation for driving automation and vehicle autonomy. Vehicles with autonomous or semi-autonomous driving or driver-assistant features can use these sensors and associated computer vision technology to maneuver the vehicle.

Some environments (e.g., dense urban environments) complicate autonomous driving tasks or functions. Due to an increased amount of obstructions and moving objects, visibility is decreased and conventional sensor technology is less useful. For example, parking extraction tasks (e.g., exiting a driveway, garage, or parking space adjacent to a roadway) may have significantly limited visibility (e.g., due to other vehicles parked in the roadway). Autonomous driving tasks associated with approaching an intersection (e.g., to either proceed through the intersection or turn at the intersection) may encounter similarly limited visibility. Typically, when sensor assistance is affected by limited visibility, the vehicle proceeds slowly into the roadway until the sensors are in a position to visualize an area of interest and provide sufficient data to complete the parking extraction or other driving task.

Systems and methods of the present disclosure are configured to implement multidirectional audio sensors (e.g., microphones) to evaluate an area of interest having reduced or limited visibility. For example, these systems and methods are configured to determine whether visibility (e.g., a line-of-sight) of one or more sensors of the vehicle is obstructed by objects between the vehicle and the roadway. In some examples, detecting limited or obstructed visibility may include, and/or be referred to as, detecting occlusions, objects, obstacles, etc. in the area of interest. As used herein, "area of interest" refers to a roadway or other driving region in an intended path of the vehicle, such as a roadway that the vehicle is entering from a parking space, driveway, garage, parking lot, or other roadway (e.g., at an intersection).

In response to detecting limited visibility (e.g., detecting one or more limited visibility conditions), audio data obtained by the audio sensors is used to identify approaching objects, such as vehicles, in the area of interest and inform autonomous driving tasks accordingly. The audio data may be used in addition to and/or instead of image sensor data (e.g., data from ultrasonic data, lidar data, camera data, etc.). In examples, the audio data is used in combination with image sensor data to identify portions of the area interest that are not visible to image sensors, portions of the area of interest that are visible to image sensors, portions of the area of interest that include stationary and moving objects (e.g., approaching vehicles), velocity and direction of approach of moving objects, etc. In some examples, collected audio and image data may be used to construct a point cloud of the area of interest.

In an example, systems and methods of the present disclosure are configured to perform noise cancelling and/or filter ambient or other types of sound from raw audio data (e.g., raw microphone signals) and identify moving vehicles in the area of interest using the filtered audio data. Identifying the moving vehicles may include performing traditional, machine learning, and/or deep learning processing techniques to isolate and identify sound signatures of vehicles, comparing the filtered audio data to sound signatures associated with moving vehicles, etc. Autonomous driving tasks are controlled in response to identifying moving vehicles in the area of interest, direction and speed of travel, etc.

Although largely described herein with respect to autonomous driving, the principles of the present disclosure may also be implemented for semi-autonomous and non-autonomous driving systems.

FIG. 1 illustrates a block diagram depicting an example system 100 for assisting a vehicle in performing parking extraction or other driving tasks according to the principles of the present disclosure. The system 100 can include at least one computing system 102 configured to process and/or store sensor data and implement one or more machine-learning models. In some examples, the computing system 102 may be configured to perform map generation and updating functions. The computing system 102 can include at least one interface 104, and in some examples can include at least one mapping system 106 for generating and updating a digital map of the roadway or area that vehicle travels. The computing system 102 can also include at least one controller 108 configured to perform various functions of the present disclosure. The computing system 102 can include hardware or a combination of hardware and software, such as communications buses, circuitry, processors, communications interfaces, among others. The computing system 102 can reside on or within a corresponding vehicle (e.g., a host vehicle). For example, FIG. 1 shows a first vehicle 110 with a computing system 102 on-board. In some examples, the system 100 may include at least one second vehicle 112 with another or similar computing system 102 on-board. Alternatively (or in addition), all or part of the computing system 102 can reside on a remote server (e.g., the cloud) which is communicatively coupled to the vehicles 110, 112 via a network 114. Each of the first vehicle 110 and the second vehicle 112 (or their corresponding computing system 102) can be communicatively connected to the network 114 to each other (e.g., via vehicle-to-vehicle (V2V) communication), to the cloud (e.g., via vehicle-to-cloud (V2C) communication), and/or to one or more other systems (e.g., a global positioning system (GPS), or to one or more communications devices). For example, the vehicles may include one or more transceivers configured to establish a secure communication channel with another vehicle or the remote server wirelessly using one or more communication protocols, such as, for example, communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee), cellular (e.g., LTE, 3G/4G/5G, etc.), wireless metropolitan area network WIMAN (e.g., WiMax), and other wide area network, WAN technologies (e.g., iBurst, Flash-OFDM, EV-DO, HSPA, RTT, EDGE, GPRS), dedicated short range communications (DSRC), near field communication (NFC), and the like. This enables the exchange of information and data that is described herein.

The computing system 102 can also include at least one data repository or storage 116. The data repository 116 can include or store sensor data 118 (e.g., audio and image sensor originating from the sensors described herein), a digital map or digital map data 120, and historical data 124. The sensor data 118 can include information about available sensors, identifying information for the sensors, address information, internet protocol information, unique identifiers, data format, protocol used to communicate with the sensors, or a mapping of information type to sensor type or identifier. The sensor data 118 can further include or store information collected by vehicle sensors 126. The sensor data 118 can store sensor data using timestamps and date stamps. The sensor data 118 can store sensor data using location stamps. The sensor data 118 can categorize the sensor data based on a classification or characteristics of a detected object or roadway conditions, or characteristics thereof.

Vehicle sensors 126 that generate the sensor data 118 can include one or more sensing elements or transducers that capture, acquire, record or convert information about the host vehicle or the host vehicle's environment into a form for processing. As examples, the sensors 126 can be or include an image sensor such as a photographic sensor (e.g., camera), radar sensor, ultrasonic sensor, millimeter wave sensor, infra-red sensor, ultra-violet sensor, light detection sensor, lidar sensor, or the like, as well as one or more audio sensors (e.g., microphones) in accordance with the principles of the present disclosure. The sensors 126 can communicate sensed data, images or recording to the computing system 102 for processing, which can include filtering, noise reduction, image enhancement, etc., followed by object recognition, feature detection, segmentation processes, and the like. The raw data originating from the sensors 126 as well as the processed data by the computing system 102 can be referred to as sensor data 118 or image data that is sensed by an associated sensor 126. In embodiments, the vehicle sensors 126 can acquire or detect information about the roadway, such as objects on the roadway.

The sensors 126 can also include or be in communication with a global positioning system (GPS) device that can determine a location of the host vehicle relative to an intersection, using map data with an indication of the roadway. The GPS device can communicate with location system 130, described further below. The computing system 102 can use the GPS device and the map data to determine that the host vehicle (e.g., first vehicle 110) is located at a particular location of a roadway when the object is detected and/or classified. The sensors 126 can also detect (e.g., using motion sensing, imaging or any of the other sensing capabilities described herein) whether any other vehicle or object is present at or approaching an area of interest, and can track any such vehicle or object's position or movement over time for instance. The sensors 126 can also detect the relative position between the vehicle and the detected object.

Using any one or more of the aforementioned types of sensors 126, the vehicle (e.g., first vehicle 110) is able to virtually map the roadway. For example, the sensors 126 calculate relative distances between detected objects and the sensor itself, and the computing system 102 can utilize a visual simultaneous localization and mapping (SLAM) system. Visual SLAM is a position detecting scheme in which a process of generating a digital map of an environment (such as a roadway or parking lot) and a process of acquiring a location of the sensor or vehicle itself are complementarily performed. In other words, characteristics of the environment about the vehicle as well as the location of the vehicle itself are determined simultaneously.

The mapping system 106 can implement visual SLAM (or similar technologies) to generate a digital map of the roadway or parking zone. The mapping system 106 is designed, constructed or operational to generate digital map data based on the data sensed by the one or more sensors 126. The digital map data structure (or referred to as digital map 120) can generate the digital map from, with or using one or more machine learning models or neural networks established, maintained, tuned, or otherwise provided via one or more machine learning models 128. The machine learning models 128 can be configured, stored, or established on the computing system 102 of the first vehicle 110, or on a remote server. The mapping system 106 can detect, from a first neural network and based on the data sensed by the one or more sensors 126, objects located on the roadway or roadway conditions. The mapping system 106 can perform, using the first neural network and based on the data sensed by the one or more sensors 126, scene segmentation. The mapping system 106 can determine, using the first neural network and based on the data sensed by the one or more sensors 126, depth information for the roadway. The mapping system 106 can identify, from the first neural network and based on the data sensed by the one or more sensors 126, one or more lane lines in the roadway. The mapping system 106 can construct the digital map based on the detected objects located in the roadway, the scene segmentation, the depth information, and the one or more lane lines. The mapping system 106 can also rely on pre-stored map data to fuse with the information sensed from the vehicle sensors 126 in creating the virtual map.

The mapping system 106 can create the digital map 120 based on the sensor data 118. This digital map 120 can be created via implemented visual SLAM, as described above. In one embodiment, the digital map 120 can include three dimensions on an x-y-z coordinate plate, and associated dimensions can include latitude, longitude, and range, for example. The digital map 120 can be updated periodically or reflect or indicate a motion, movement or change in one or more objects detected on the road. For example, the digital map can include stationary objects associated with the scene, such as a curb, tree, lines, parking signs, or buildings, as well as non-stationary objects such as vehicles moving or a person moving (e.g., walking, biking, or running). The presence and location of the detected objects in the roadway (e.g., debris) can be included in the digital map.

Various types of machine learning models 128 are disclosed herein. The machine learning model utilized by the mapping system 106 to generate the digital map 120 can include any type of neural network, including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, or the like. Each machine learning model 128 can maintain, manage, store, update, tune, or configure one or more neural networks and can use different parameters, weights, training sets, or configurations for each of the neural networks to allow the neural networks to efficiently and accurately process a type of input and generate a type of output.

One or more of the disclosed machine learning models 128 disclosed herein can be configured as or include a convolution neural network. The convolution neural network (CNN) can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The CNN can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

One or more of the disclosed machine learning models 128 disclosed herein can include a CNN having an input layer and an output layer, and one or more hidden layers that can include convolution layers, pooling layers, fully connected layers, or normalization layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer. The fully connected layers can connect every neuron in one layer to every neuron in another layer.

To assist in generating the digital map 120, the computing system 102 can interface or communicate with a location system 130 via network 114. The location system 130 can determine and communicate the location of one or more of the vehicles 110, 112 during the performance of the SLAM or similar mapping techniques executed in generating the digital map 120. The location system 130 can include any device based on a positioning system such as Global Navigation Satellite System (GNSS), which can include GPS, GLONASS, Galileo, Beidou and/or other regional systems. The location system 130 can include one or more cellular towers to provide triangulation. The location system 130 can include wireless beacons, such as near field communication beacons, short-range wireless beacons (e.g., Bluetooth beacons), or Wi-Fi modules.

The computing system 102 can be configured to utilize interface 104 to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information, e.g., image data. The interface 104 can be designed, constructed or operational to communicate with the controller 108 to provide commands or instructions to control a vehicle, such as the first vehicle 110. The information collected from the one or more sensors can be stored as shown by sensor data 118.

The interface 104 can receive the image data sensed by the one or more sensors 126 regarding an environment or characteristics of a roadway or parking zone. The sensed data received from the sensors 126 can include data detected, obtained, sensed, collected, or otherwise identified by the sensors 126. As explained above, the sensors 126 can be one or more various types of sensors, and therefore the data received by the interface 104 for processing can be data from a camera, data from an infrared camera, lidar data, laser-based sensor data, radar data, transducer data, or ultrasonic sensor data. Because this data can, when processed, enable information about the roadway or parking zone to be visualized, this data can be referred to as image data.

The data sensed from the sensors 126 can be received by interface 104 and delivered to mapping system 106 for detecting various qualities or characteristics of the roadway as explained above utilizing techniques such as segmentation, CNNs, or other machine learning models. For example, the mapping system 106 can rely on one or more neural networks or machine learning models 128 to detect objects, scene segmentation, roads, terrain, trees, curbs, obstacles, depth or range of the parking lot, debris, lane line detection, parking marker detection, parking signs, or roadway signs. The computing system 102 can train the machine learning models 128 using historical data 124. This training can be performed remote from a computing system 102 installed on a vehicle 110, 112. In other words, the computing system 102 may be on a remote server for at least these purposes. Once trained, the models can be communicated to or loaded onto the vehicles 110, 112 via network 114 for execution.

As described above, one or more machine learning models 128 can be relied upon to perform the various functions described herein. These machine learning models 128 can include a motion prediction model 132, an object classification model 134, an action model 136, and other models. The motion prediction model 132 is trained and configured to receive the sensor data 118 (or encoded or processed image data and audio data in accordance with the principles of the present disclosure), along with the vehicle dynamics (e.g., GPS, mapping data), and output a predicted motion of a detected object, such as a vehicle in the area of interest. The motion prediction model 132 is configured to detect such motion and predict subsequent motion of the object based on its previous motion. This can include trajectory analysis, for example, based on the previous trajectory of that object.

The object classification model 134 is trained and configured to, based on the image data, perform image classification (e.g., segmentation) to determine information about the detected object (e.g., multiple layers or granularities about the object), and generate and update the roadway data 122 with this information. For example, the object classification model 134 can be a machine learning model that determines not only the presence of an object or roadway condition, but also the type of object or roadway condition, its size, relative orientation, and the like.

The action model 136 is trained and configured to command or take an appropriate action, such as slow the vehicle down, move the vehicle to the side, or assume a new vehicle trajectory to avoid the object. The action model 136 according to the present disclosure is configured to selectively perform functions associated with a parking extraction or other driving task based on detected vehicles in the area of interest as described below in more detail.

For example, the sensors 126 may include multidirectional audio sensors configured to evaluate an area of interest having reduced or limited visibility. The computing system 102 is configured to determine whether one or more image sensors of the vehicle 110 are obstructed by objects between the vehicle 110 and the roadway. In response to detecting limited visibility, audio data obtained by the audio sensors is used to identify approaching objects, such as vehicles, in the area of interest and inform autonomous driving tasks accordingly. Autonomous driving tasks are controlled in response to identifying moving vehicles in the area of interest, direction and speed of travel, etc. as described below in more detail. Although described herein with respect to image sensors, the principles of the present disclosure can be implemented in vehicles and other systems using other types of sensors (e.g., the computing system 102 may configured to determine whether other types of sensors are obstructed and perform various functions accordingly as described below in more detail).

Figure 2A:
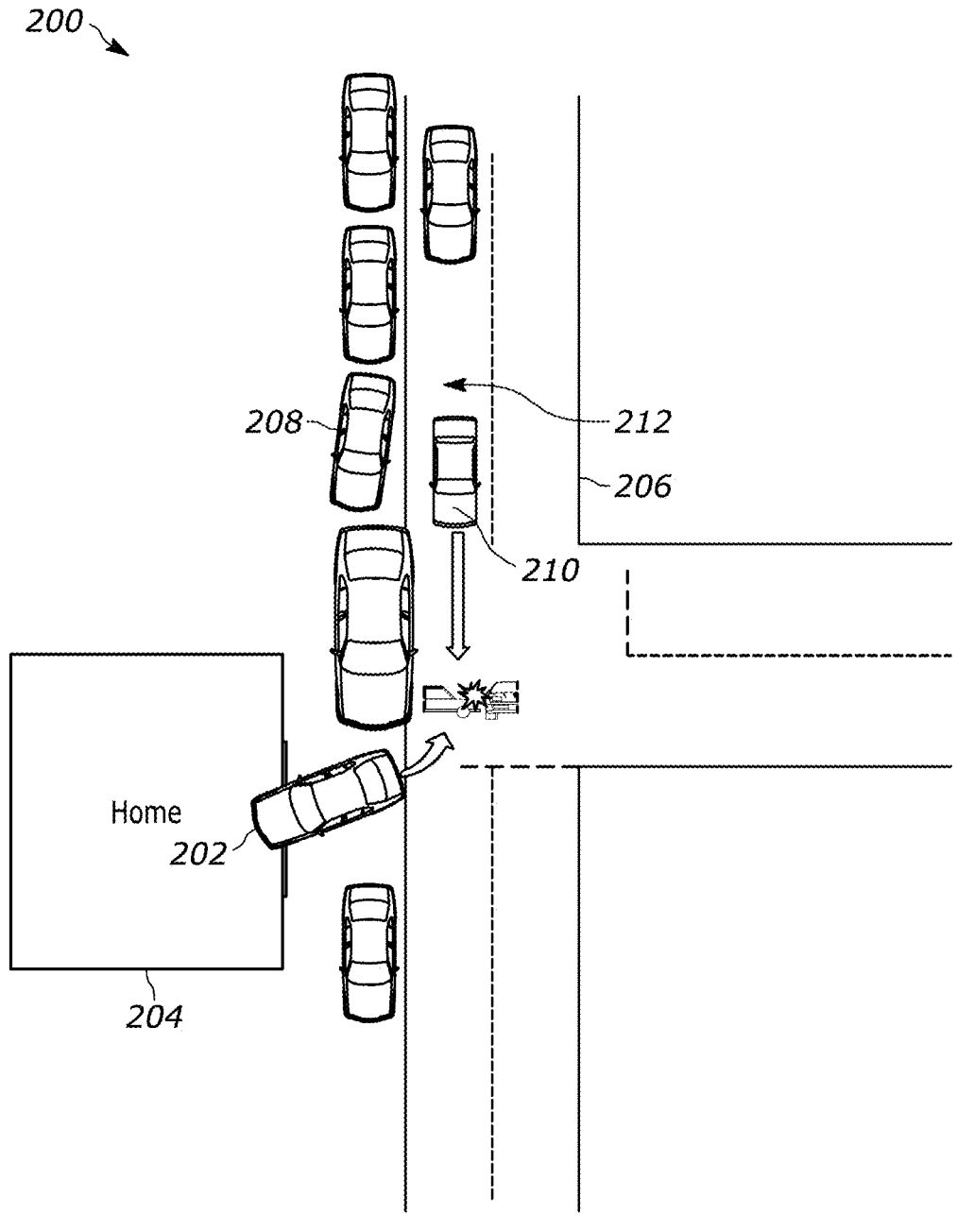
FIG. 2A illustrates an example environment of a vehicle attempting to perform a parking extraction task.

FIG. 2A shows one example of an environment 200 of a vehicle 202 attempting to perform a parking extraction task (e.g., leaving a home or other location 204). For example, the vehicle 202 may be attempting to exit the location 204 (e.g., via a garage, driveway, etc.) to enter a roadway 206. The environment 200 may have an increased amount of obstructions, such as one or more parked vehicles 208 adjacent to and/or in the roadway 206, one or more moving vehicles 210, etc. In this example, the environment 200 includes at least on moving vehicle (i.e., the moving vehicle 210) in an area of interest 212.

As shown, the parking extraction tasks (e.g., exiting the location 204 and entering the roadway 206) has limited visibility due to, for example, the vehicles 208 parked adjacent to the roadway 206. Accordingly, image sensor assistance is affected by the limited visibility, and the vehicle 202 is required to proceed slowly into the roadway 206 until image sensors (e.g., image sensors on a portion of the vehicle 202 nearest the roadway 206) are in a position to visualize the area of interest 212 and provide sufficient data to complete the parking extraction task. In some examples, the vehicle 202 must begin to enter/protrude into the roadway 206 to allow the image sensors to visualize the area of interest 212, risking collision with the moving vehicle 210, causing the moving vehicle 210 to brake or perform another maneuver, etc.

Figure 2B:
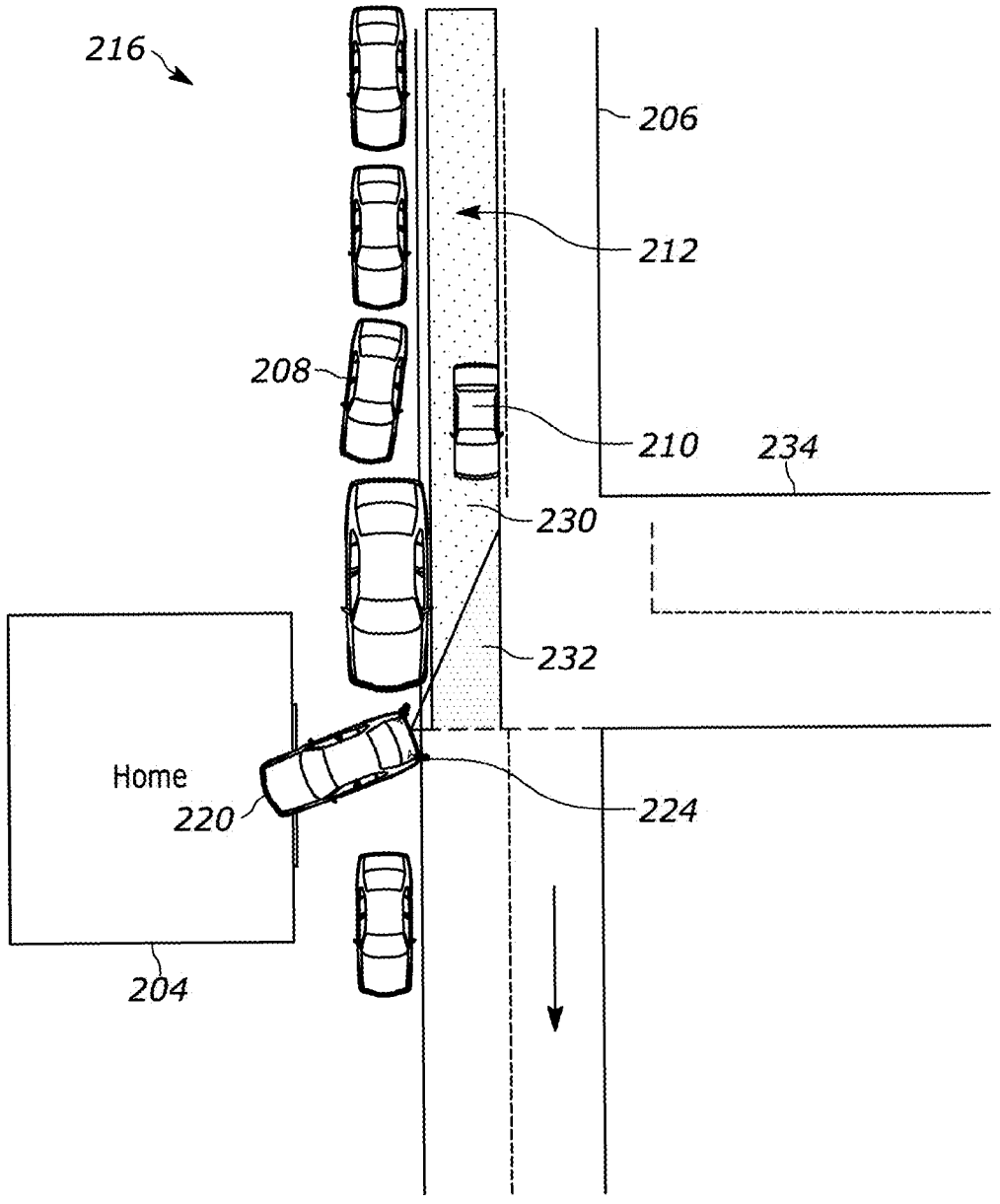
FIGS. 2B and 2C illustrate an environment of a vehicle configured to implement multidirectional audio sensors to evaluate an area of interest according to the present disclosure.
Figure 2C:
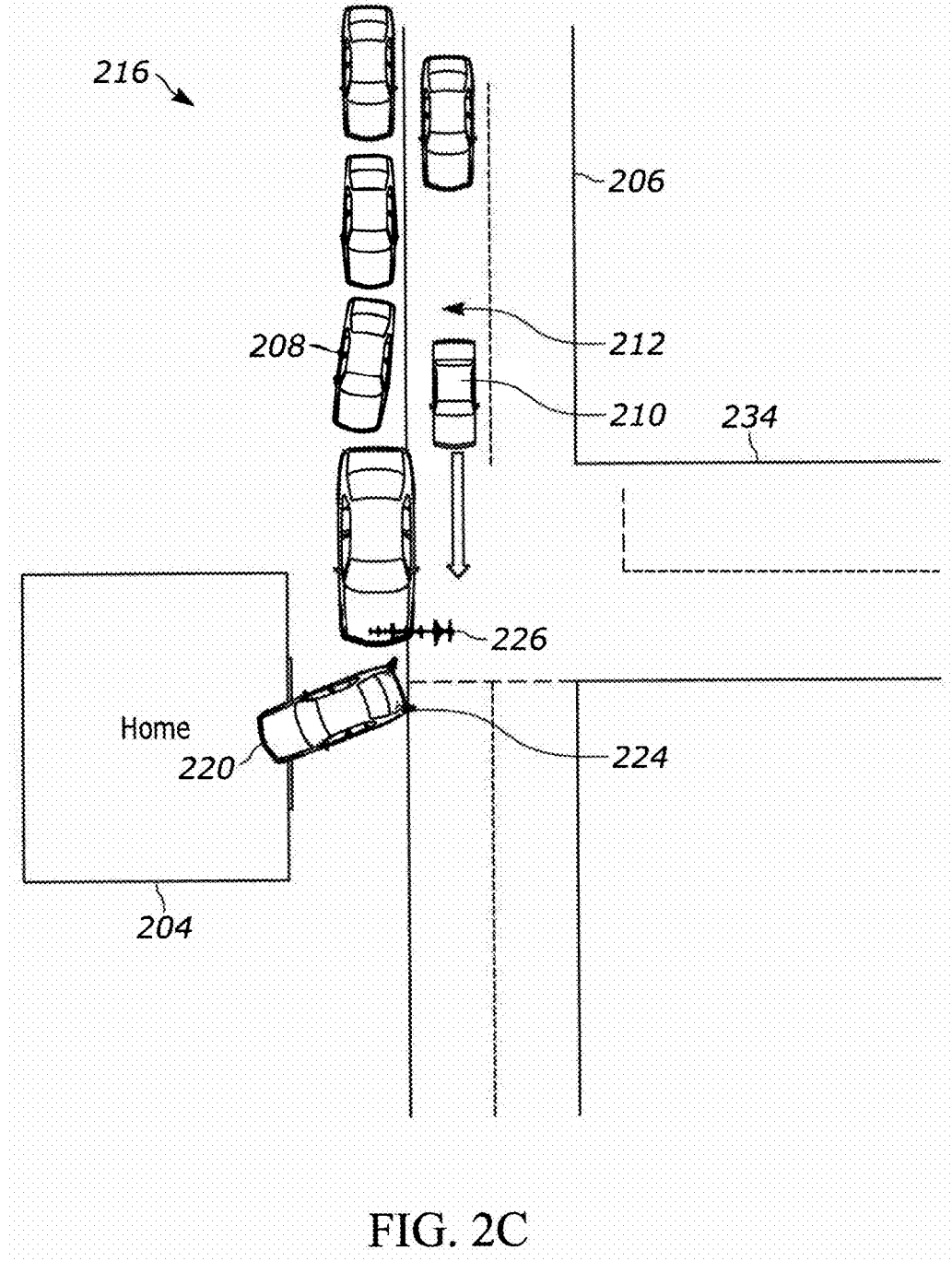

FIGS. 2B and 2C show an environment 216 of a vehicle 220 configured to implement multidirectional audio sensors 224 (e.g., directional microphones) to evaluate the area of interest 212 having reduced or limited visibility according to the principles of the present disclosure. For example, the audio sensors 224 may be located at respective corners (e.g., both front and rear corners) of the vehicle 220, located adjacent to or integrated with circuitry including image sensors, located on top surfaces of the vehicle 220, etc. Although described below with respect to a parking extraction task, the principles of the present disclosure may be implemented with other types of driving tasks, such as yield tasks at an intersection of a roadway.

The vehicle 220 may include and/or communicate with a computing device or system configured to determine whether one or more image sensors of the vehicle 220 are obstructed by objects such as the vehicles 208 between the vehicle 220 and the roadway 206. In response to detecting limited visibility, audio data obtained by the audio sensors 224 (e.g., one or more audio signals 226 received and processed by the audio sensors 224, provided to a computing device or system, etc.) is used to identify approaching objects, such as the moving vehicle 210, in the area of interest 212 and inform autonomous driving tasks accordingly. Autonomous driving tasks are controlled in response to identifying moving vehicles in the area of interest 212, direction and speed of travel, etc. In an example, the vehicle 220 (i) identifies the area of interest 212 (e.g., identifies, using image sensor data, mapping data, etc., an area of the roadway 206 required to perform the parking extraction task), (ii) determines whether visibility of any of the area of interest 212 is obstructed, (iii) in response to determining whether visibility of the area of interest 212 is obstructed, detects, using audio data, moving vehicles in the area of interest 212, and (iv) controls the vehicle 220 to complete the parking extraction task accordingly.

As shown in FIG. 2B, the area of interest 212 (e.g., an area of the roadway 206 corresponding to an intended path of the vehicle) may be segmented into an obstructed region 230 (i.e., a region having limited visibility due to objects such as the vehicles 208 interfering with the line-of-sight of image sensors of the vehicle 220) and a visible region 232 (i.e., a region visible to the image sensors of the vehicle 220). For example, a computing device or system may be configured to continuously (e.g., prior to and during performance of the parking extraction task) determine the area of interest 212 and calculate the regions 230 and 232. As the vehicle 220 performs the parking extraction task and moves into the roadway 206, the region 232 may generally increase while the region 230 generally decreases. Calculation of the area of interest 212 and the regions 228 and 230 may be performed using image data as described herein, mapping data, and/or other data (e.g., data indicating a lane of the roadway 206 that the vehicle 220 is attempting to enter, data indicating a number of lanes of the roadway 206, direction of travel of the lanes, etc.). For example, in examples where the roadway 206 is one-way (i.e., in the direction of the arrow in FIG. 2B), the area of interest 212 may include only the area of the roadway 206 "upstream" of the vehicle 220. Conversely, in examples where the roadway 206 permits two-way travel, the area of interest 212 may include areas of the roadway downstream of the vehicle 220. In some examples, the area of interest 212 may include portions of one or more intersecting roadways 234.

In some examples, a size or length of the area of interest 212 (e.g., a linear distance from the vehicle 220 along a driving direction of the roadway 206) may be determined based on a speed limit of the roadway 206. For example, the area of interest 212 may be relatively longer for higher speed limits and relatively shorter for lower speed limits. In this manner, the length of the area of interest 212 may be determined in accordance with an amount of time required to complete the parking extraction task and amount of time (e.g., based on the speed limit) required for a moving vehicle to reach the vehicle 220 from outside the area of interest 212.

In response to a determination whether all or a portion (e.g., a portion greater than a predetermined threshold) of the area of interest 212 includes at least one obstructed (i.e., non-visible) region, the vehicle 220 activates audio sensing functions (e.g., activates the audio sensors 224) to detect moving vehicles in the area of interest 212. As used herein, activating audio sensing functions may refer specifically to activating audio sensing functions related to the detection of moving vehicles in the area of interest 212 according to the principles of the present disclosure. In other words, the vehicle 220 may be configured to perform other audio sensing functions unrelated to detecting moving vehicles in the area of interest 212. In some examples, audio sensing functions are activated regardless of whether an obstructed region is detected (i.e., the audio sensors 224 may be activated by default).

In some examples, activating the audio sensing functions may be performed manually (e.g., in a semi-autonomous or non-autonomous vehicle). For example, a driver may observe that the region is obstructed and activate the audio sensing functions (e.g., using an interface of the vehicle 220). In some examples, the speed of the vehicle 220 may be limited in response to the audio sensing functions being activated.

As shown in FIG. 2C, to perform the audio sensing functions, the audio sensors 224 detect the one or more audio signals 226. The audio signals 226 (e.g., raw audio data) include audio signals from various sources in the environment 216 of the vehicle 220, including, but not limited to, environmental audio signals, audio signals from one or more vehicles within the area of interest 212, audio signals from one or more vehicles outside of the area of interest 212, audio signals from the vehicle 220, noise, etc. A computing system of the vehicle 220 according to the present disclosure is configured to receive the audio signals 226, identify one or more audio signals corresponding to moving vehicles in the area of interest 212 (e.g., the vehicle 210), and control the vehicle 220 to complete the parking extraction task based on audio signals corresponding moving vehicles in the area of interest 212.

For example, the computing system is configured to process the audio signals 226 to filter ambient/environmental sound, perform noise cancelling, etc., and to identify audio signals corresponding to moving vehicles. As one example, the computing system implements deep learning or other machine learning techniques, classical signal processing techniques, etc. as described herein to isolate audio signals corresponding to sound signatures of moving vehicles. In some examples, the computing system stores, in memory, reference data indicative of one or more reference audio signals corresponding to moving vehicles, compares one or more detected audio signals with the reference audio signals, and determines whether any of the audio signals correspond to the reference audio signals. In this manner, the computing system determines whether any of the audio signals 226 corresponds to a moving vehicle in the area of interest 212.

The computing system may be further configured to determine, based on the audio signals 226, whether a detected audio signal corresponds to a vehicle that is approaching (i.e., coming closer to) the vehicle 220 or moving further away from the vehicle 220, a direction of travel of the vehicle, a speed of the vehicle, etc. In some examples, audio signals corresponding to moving vehicles may be compared to image data (e.g., to determine whether an audio signal corresponds to a vehicle in a visible region). In some examples, the audio sensors 224 include directional microphones configured to sense a direction from which an audio signal was received. In other examples, direction and/or direction of travel of vehicles based on comparisons between reception timing of the audio signals as received at different audio sensors. In some examples, direction of travel may be determined based on increasing or decreasing magnitudes of the audio signals.

Autonomous driving tasks can then be controlled in response to identifying moving vehicles in the area of interest 212, direction and speed of travel within the area of interest, 212, etc. For example, in response to a determination that there are no moving vehicles in the area of interest 212, the vehicle 220 may be controlled to complete the parking extraction task. In response to a determination that there are one or more vehicles in the area of interest 212, the vehicle 220 may be controlled further based on a determination of whether any vehicles are moving toward the vehicle 220 within the area of interest 212, the speed of the vehicles moving toward the vehicle 220, an amount of time required to complete the parking extraction task, etc. The area of interest 212, the regions 230 and 232, and the audio signals 226 are continuously monitored and updated (e.g., as more image data becomes available due to the vehicle 220 entering the roadway 206, as vehicles enter, pass through, and leave the area of interest 212, etc.) during the parking extraction task.

Figure 3:
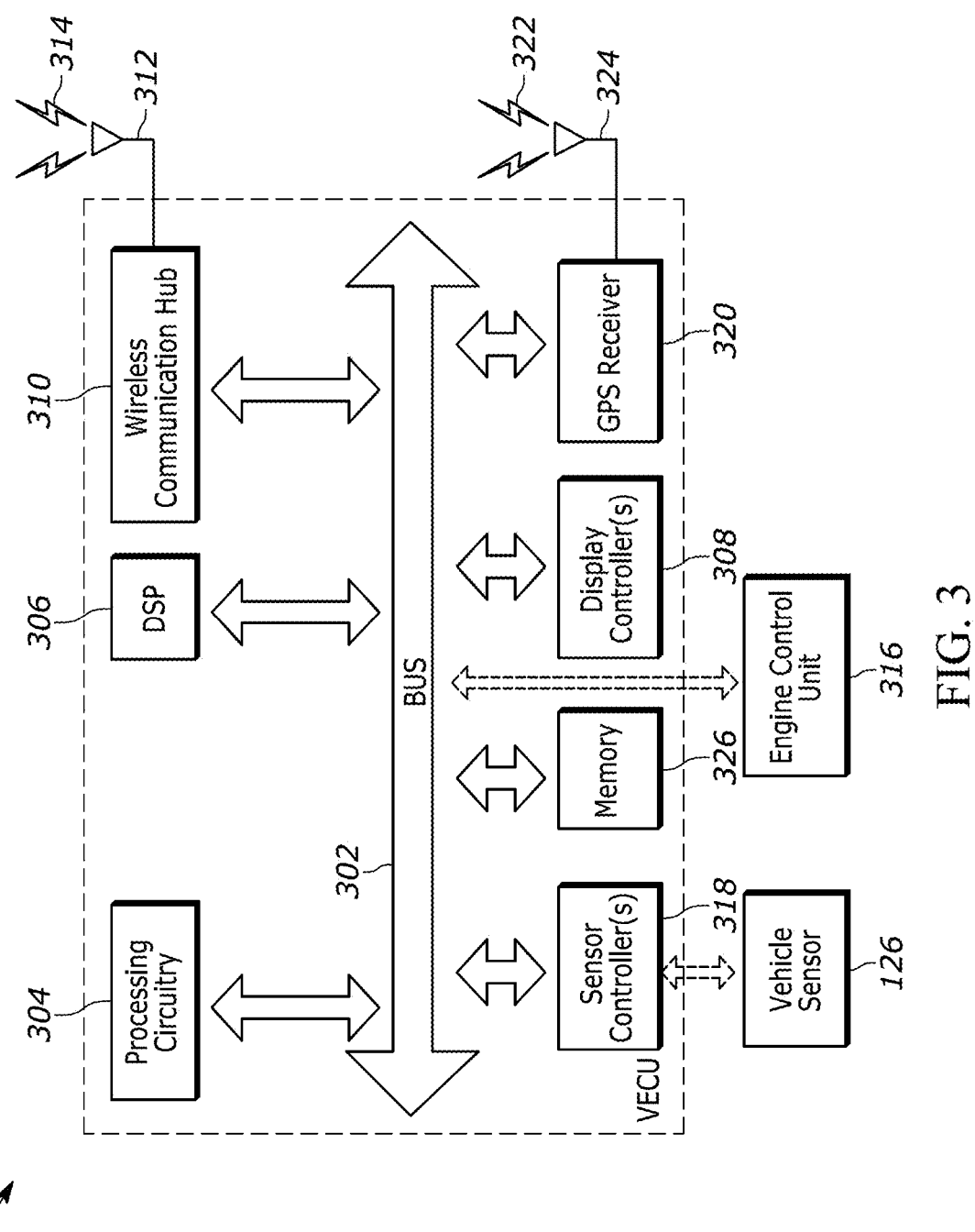
FIG. 3 illustrates a block diagram of computer system according to the present disclosure.

FIG. 3 is a block diagram of internal components of an exemplary embodiment of a computing system 300. The computing system 300 may include or be used to implement the computing systems and methods described above. In this embodiment, the computing system 300 may be embodied at least in part in a vehicle electronics control unit (VECU) or other computing system of a vehicle, such as the vehicle 220 of FIGS. 2B and 2C. It should be noted that FIG. 3 is meant only to provide a generalized illustration of various components, any or all of which may be utilized as appropriate. It can be noted that, in some instances, components illustrated by FIG. 3 can be localized to a single physical device and/or distributed among various networked devices, which may be disposed at different physical locations.

The computing system 300 has hardware elements that can be electrically coupled via a BUS 302. The hardware elements may include processing circuitry 304 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 306, depending on desired functionality. The computing system 300 can also include one or more display controllers 308, which can control the display devices disclosed above, such as an in-vehicle touch screen, screen of a mobile device, and/or the like.

The computing system 300 may also include a wireless communication hub 310, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 310 can permit data to be exchanged with network 114, wireless access points, other computing systems, etc. The communication can be carried out via one or more wireless communication antenna 312 that send and/or receive wireless signals 314.

The computing system 300 can also include or be configured to communicate with an engine control unit 316, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 310, the engine control unit 316 can be operated in order to control the movement of the vehicle during, for example, a parking extraction task.

The computing system 300 also includes vehicle sensors 126 such as those described above with reference to FIG. 1. These sensors can include, without limitation, one or more accelerometer(s), gyroscope(s), camera(s), radar(s), LiDAR (s), odometric sensor(s), and ultrasonic sensor(s), as well as magnetometer(s), altimeter(s), microphone(s), proximity sensor(s), light sensor(s), and the like. These sensors can be controlled via associated sensor controller(s) 318. The sensors 126 according to the present disclosure may include the audio sensors 224 described in FIGS. 2B and 2C.

The computing system 300 may also include a GPS receiver 320 configured to receive signals 322 from one or more GPS satellites using a GPS antenna 324. The GPS receiver 320 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 300 can also include or be in communication with a memory 326. The memory 326 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 326 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

Figure 4:
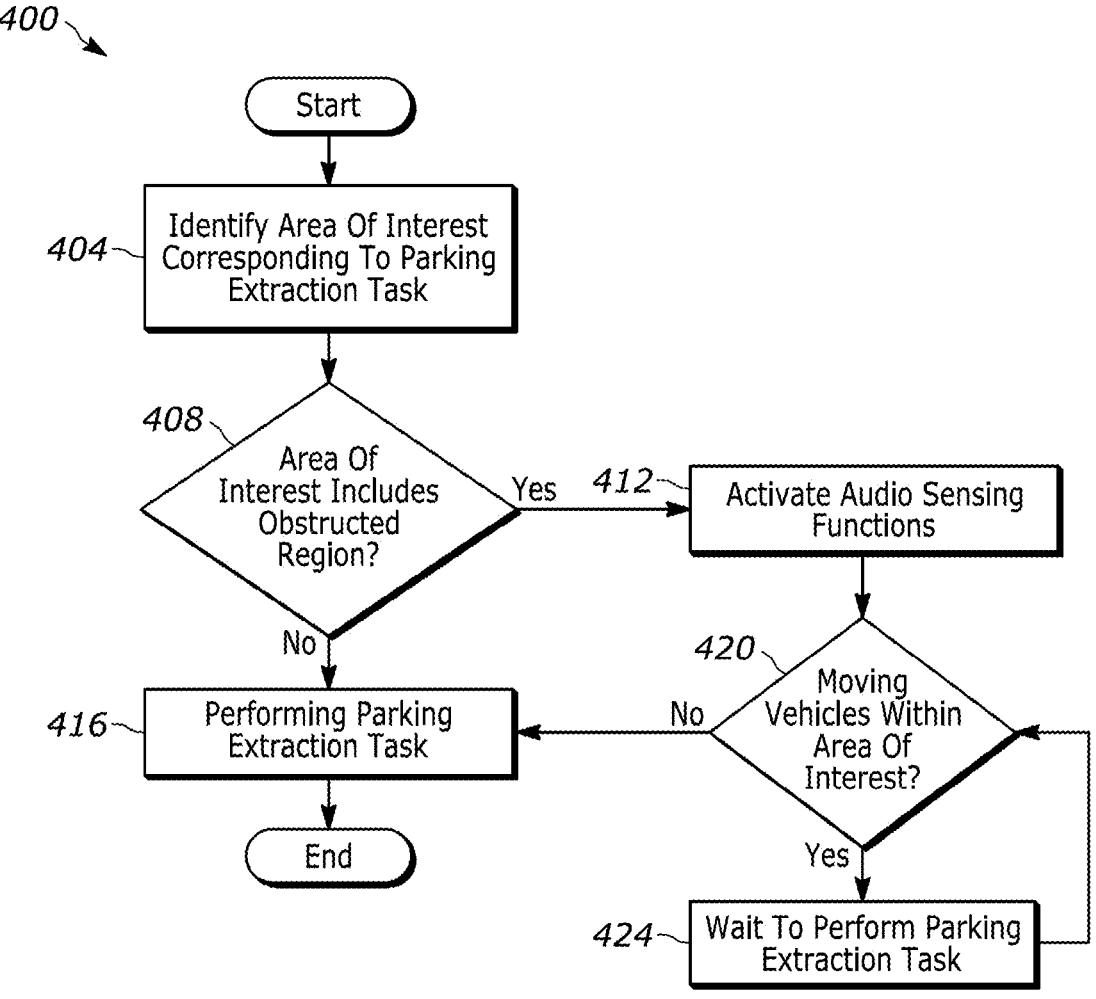
FIG. 4 illustrates steps of an example method for controlling a vehicle based on audio signals according to the present disclosure.

FIG. 4 illustrates steps of an example method 400 for controlling a vehicle based on audio signals as described herein. One or more computing devices, systems, processors or processing devices, circuitry, etc. as described herein may be configured to perform the method 400. For example, a computing system such as the computing system 300, operating within the system 100, all or portions of which may be implemented within a vehicle, is configured to perform the method 400.

At 404, the method 400 includes identifying an area of interest corresponding to a driving task, such as a parking extraction task. At 408, the method 400 includes determining whether any of the area of interest includes an obstructed region, such as a region with limited visibility caused by one or more occlusions or objects interfering with a line-of-sight of one or more image sensors of the vehicle. If true, the method 400 continues to 412. If false, the method 400 continues to 416.

At 412, the method 400 includes activating audio sensing functions. At 420, the method 400 includes determining, based on one or more audio signals, whether any moving vehicles are within the area of interest. If true, the method 400 continues to 424. If false, the method 400 continues to 416. At 424, the method 400 includes selectively waiting to perform the parking extraction task and then proceeding to 420. Steps 420 and 424 may correspond to continuously determining, based on the audio signals, whether any moving vehicles are in the area of interest and proceeding to 416 in response to determining that no moving vehicles are in the area of interest.

At 416, the method 400 includes controlling the vehicle to perform the parking extraction task. For example, the method 400 includes controlling the vehicle to enter the roadway while continuing to monitor the area of interest using both image sensors and audio sensors. While performing the parking extraction task, the method 400 may continuously update the area of interest, calculate and update obstructed and visible regions within the area of interest, monitor audio signals to detect moving vehicles within the area of interest, etc. (i.e., dependent upon whether the method 400 determined that the area of interest includes an obstructed region at 408).

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method performed by a computing device configured to control an autonomous or semi-autonomous driving task of a vehicle, the method comprising:

identifying, based on image data obtained from one or more sensors, an area of interest corresponding to the driving task;

determining whether the area of interest includes an obstructed region for which line-of-sight of at least one of the one or more sensors is blocked by an object;

activating, subsequent and in response to a determination that the area of interest includes the obstructed region, audio sensing functions to receive audio signals by one or more audio sensors of the vehicle;

determining, in response to the determination that the area of interest includes the obstructed region, whether the area of interest includes a moving vehicle based on the audio signals received by the one or more audio sensors of the vehicle; and controlling the vehicle to perform the driving task based on the determination of whether the area of interest includes a moving vehicle.

2. The method of claim 1, wherein the driving task is one of a parking extraction task and a driving task at an intersection of a roadway.

3. The method of claim 1, wherein the one or more audio sensors includes a directional microphone.

4. The method of claim 1, wherein the area of interest corresponds to a lane of a roadway in an intended path of the vehicle.

5. The method of claim 1, further comprising, while selectively controlling the vehicle to perform the driving task, determining, based on the audio signals, whether a moving vehicle enters the area of interest.

6. The method of claim 1, further comprising limiting a speed of the vehicle during the driving task based on the determination of whether the area of interest includes a moving vehicle.

7. The method of claim 1, wherein determining whether the area of interest includes a moving vehicle includes detecting, in the audio signals, an audio signal corresponding to a moving vehicle.

8. The method of claim 7, wherein detecting the audio signal corresponding to a moving vehicle includes filtering the audio signals.

9. The method of claim 7, wherein detecting the audio signal corresponding to a moving vehicle includes comparing the audio signals to at least one reference audio signal corresponding to a moving vehicle.

10. The method of claim 1, further comprising selectively controlling the vehicle to perform the driving task based on a speed of a moving vehicle traveling through the area of interest.

11. A system configured to control an autonomous or semi-autonomous driving task of a vehicle, the system comprising:

one or more sensors configured to obtain image data in an area of interest corresponding to the driving task; and a computing system configured to determine whether the area of interest includes an obstructed region for which line-of-sight of at least one of the one or more sensors is blocked by an object, subsequent and in response to a determination that the area of interest includes the obstructed region, activating audio sensing functions to receive audio signals by one or more audio sensors of the vehicle;

in response to the determination that the area of interest includes the obstructed region, determine, based on the audio signals received by the one or more audio sensors of the vehicle, whether the area of interest includes a moving vehicle, and selectively control the vehicle to perform the driving task based on the determination of whether the area of interest includes a moving vehicle.

12. The system of claim 11, wherein the driving task is one of a parking extraction task and a driving task at an intersection of a roadway.

13. The system of claim 11, wherein the one or more audio sensors includes a directional microphone.

14. The system of claim 11, wherein the area of interest corresponds to a lane of a roadway in an intended path of the vehicle.

15. The system of claim 11, wherein selectively controlling the vehicle to perform the driving task includes determining, based on the audio signals, whether a moving vehicle enters the area of interest.

16. The system of claim 11, wherein the computing system is configured to limit a speed of the vehicle during the driving task based on the determination of whether the area of interest includes a moving vehicle.

17. The system of claim 11, wherein determining whether the area of interest includes a moving vehicle includes detecting, in the audio signals, an audio signal corresponding to a moving vehicle.

18. The system of claim 17, wherein detecting the audio signal corresponding to a moving vehicle includes filtering the audio signals and comparing the audio signals to at least one reference audio signal corresponding to a moving vehicle.

19. The system of claim 11, wherein the computing system is configured to control the vehicle to perform the driving task based on a speed of a moving vehicle traveling through the area of interest.

20. A processor configured to execute instructions stored on a non-transitory computer-readable medium, wherein executing the instructions causes the processor to:

identify, based on image data obtained from one or more sensors, an area of interest corresponding to a driving task of an autonomous or semi-autonomous vehicle;

determine whether the area of interest includes an obstructed region for which line-of-sight of at least one of the one or more sensors is blocked by an object;

subsequent and in response to a determination that the area of interest includes the obstructed region, activating audio sensing functions to receive audio signals by one or more audio sensors of the vehicle;

in response to the determination that the area of interest includes the obstructed region, determine, based on the audio signals received by the one or more audio sensors of the vehicle, whether the area of interest includes a moving vehicle; and selectively control the vehicle to perform the driving task based on the determination of whether the area of interest includes a moving vehicle.

* * * * *